United States Patent Office 3,375,231
Patented Mar. 26, 1968

3,375,231
COPOLYMER OF ETHYLENEIMINES AND LACTONES AND PROCESS OF PREPARING SAME
Kenichi Fukui, Sachio Yuasa, Tsutomu Kagiya, and Takeo Shimizu, Kyoto, and Takezo Sano, Niihama-shi, Japan, assignors to Sumitomo Chemical Company, Ltd., Osaka, Japan, a corporation of Japan
No Drawing. Filed Dec. 23, 1963, Ser. No. 332,840
Claims priority, application Japan, Dec. 28, 1962, 37/59,678
6 Claims. (Cl. 260—78.3)

The present invention relates to novel copolymers of a β-lactone and an ethyleneimine compound, and a method for producing the same. More particularly, it relates to novel copolymers which may be liquid, semi-solid, solid or resinous and are composed of the ring-opened units of a β-lactone and an ethyleneimine compound, and to a method for producing the same by ring-opening copolymerization of a β-lactone and an ethyleneimine compound.

So far, the polymerizations of β-lactones with an acid or an alkali catalyst, and of ethyleneimines with an acid catalyst have been well known. However, the polymer products have drawbacks with regard to softening point, resistivity to solvents, degree of polymerization, spinability, processability, stability, etc., and are not of practical use.

The present inventors have long been investigating the reaction of β-lactones with amines, and have found that amines in a catalytic amount can readily yield polymers of β-lactones, and that ethyleneimines readily polymerize by use of a slight amount of acid catalyst through ring-opening to yield polyamines. They have also recognized that β-lactones and ethyleneimines mutually serve as polymerization catalysts for each other and are bound to the growing terminals. The inventors have now conducted the copolymerization of these members, basing upon these experimental facts, and succeeded in obtaining novel copolymers.

Thus, an object of the invention is to provide novel copolymers of a β-lactone and an ethyleneimine compound, having recurring structures of amine-, ester-, ether- and amide-linkages. Another object is to provide a method for producing such copolymers from a β-lactone and an ethyleneimine. Other objects will be apparent from the following description.

The copolymers of a β-lactone and an ethyleneimine compound, according to the present invention, are unknown in the literatures. They are composed of the ring-opened units of a β-lactone and an ethyleneimine compound, therefore possessing the recurring structure of amine-, ester-, ether- and amide-linkages in the molecules. They have properties which vary broadly depending upon the distribution and the amount of the amine-, ester-, ether-, and amide-linkages. Thus, the copolymers may vary from solid substance readily soluble in water to semi-solid substance hardly soluble in water but readily soluble in organic solvent, and to insoluble and infusible resinous substance.

The β-lactones employed in the present invention involve β-propiolactone, β-butyrolactone, β-isobutyrolactone, β-isovalerolactone, α,α-bis(chloromethyl)-β-propiolactone, α,α-diphenyl-β-propiolactone, and others having β-lactone ring, which can be opened by acids or bases, in the molecule. These β-lactones are embraced in the general formula,

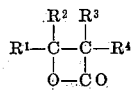

wherein $R^1$ and $R^2$ represent each hydrogen atom or a lower alkyl radical, and $R^3$ and $R^4$ represent each hydrogen atom or alkyl, chloromethyl or aryl radical. These β-lactones are easily synthesized according to the known procedures and can singly be ring-opening-polymerized with an alkaline substance.

The ethyleneimines employed in the present invention involve ethyleneimine itself and its homologs and derivatives having at least one ethyleneimine ring. The examples are ethyleneimine, 2-methylethyleneimine, 2,2-dimethylethyleneimine, 2,3 - dimethyl - ethyleneimine, and other C - substituted ethyleneimine derivatives; and N-methylethyleneimine and other N-alkylethyleneimines, N-acetylethyleneimine and other N-acylethyleneimines, N,N' - bis - ethyleneurea, N,N'-hexamethylenebisethyleneurethane, and other bis-ethyleneimine compounds, and other N-substituted ethyleneimine derivatives.

These ethyleneimines are embraced in the general formula,

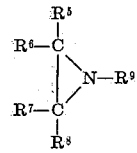

wherein $R^5$, $R^6$, $R^7$ and $R^8$ each represents hydrogen atom or an alkyl radical, and $R^9$ represents hydrogen atom, an alkyl or acyl radical, or a group of

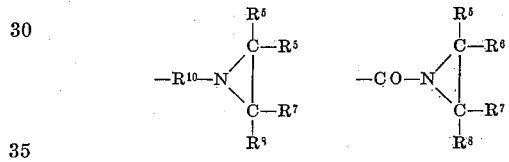

or

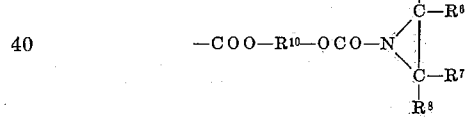

$R^{10}$ being alkylene radical. They can be synthesized according to the known procedures and can be ring-opening-polymerized by an acid catalyst on heating.

For the preparation of the copolymers of a β-lactone and an ethyleneimine compound according to the present invention, both comonomers are mixed together in the presence or absence of a suitable solvent at a temperature of −20° to +200° C. Various copolymers having any desired properties can be produced by selection of the kinds and proportion of the comonomers, as well as the solvent, if employed, and the reaction temperature.

The solvent, if employed, should be inert to the ethyleneimine, and β-lactone radicals. The illustrative examples involve liquid hydrocarbons, such as hexane, benzene, toluene, and the like; halogenated hydrocarbons, such as ethylene chloride, ethyl bromide, chlorobenzene, chloroform, and the like; nitriles, such as acetonitrile and the like; esters, such as ethyl acetate and the like; ketones, such as acetone, cyclohexanone and the like; ethers, such as ethyl ether, tetrahydrofuran, anisole and the like and dimethylformamide and dimethylacetamide, and others. They may be employed alone or as a mixture thereof. Ordinarily, the use of a solvent is preferable, since it prevents or minimizes violent and explosive reaction and local heating, and ensures the easy control of the reaction and the obtainment of a polymer having a homogeneous composition.

The inventors have found that the properties of the copolymers have a close relation to the dielectric constant of the solvent employed. That is, the state of distribution and the amount of the amine-, ester-, ether- and amide-linkages in the product copolymers is affected by the dielectric constant of the solvent, if employed.

Since each of the comonomers acts as the catalyst for the other, no other catalysts are necessary. However, addition of a catalytic amount of an acidic or alkaline catalyst is preferable for the purpose of obtaining an easy and smooth reaction. The examples involve various amines such as triethylamine and tin tetrachloride. If desired, a compound having active hydrogen, such as alcohols, phenols, mercaptans, amines, organic acids, and the like, may be added before or after the reaction, so as to assist the commencement or finish of the reaction.

The proportion of the comonomers to be mixed for the production of the copolymers according to the present invention may be freely selected depending upon the desired object. Ordinarily, the mol ratio ranging from about 1:20 to about 20:1 is preferable. The temperature at which the comonomers are mixed together varies from −20° to +200° C. When the reaction is conducted in the absence of solvent, the temperature is desirably selected within a lower range, such as −10° to +50° C., so as to avoid a violent reaction condition. When the reaction is conducted in the presence of solvent, any of the temperatures as above-identified may be employed.

To ensure the efficient and smooth reaction, two stage systems may be employed. Thus, both comonomers are contacted with each other in a suitable solvent at a comparatively low temperature to yield a low molecular weight adduct or prepolymer, which is then separated and heated at a temperature of 50° to 200° C. to yield a high molecular weight copolymer. Alternatively, the low molecular weight adduct or prepolymer is added with additional comonomers, a β-lactone and/or an ethyleneimine compound, to yield a high molecular weight copolymer. When a block copolymer is contemplated, one of the comonomers is homo-polymerized, and then the resulting polymer is further polymerized in the presence of the other comonomer. By repeating this procedure, a desired block copolymer is obtained. In a practical procedure, both comonomers may be separately and alternately added portionwise to the reaction system under conditions which produce a comparatively quick proceeding of the reaction.

The copolymers of a β-lactone and an ethyleneimine compound have various uses. Those having a comparatively low degree of polymerization, especially those soluble in water, may be useful as a textile-finishing agent, improving agent for dyeability, antistatic agent, etc. Those having a comparatively high degree of polymerization are resinous, solid and insoluble in water, and can be used for the purification of water according to their ion-exchanging property, and for the production of various shaped articles.

The invention will further be explained with reference to the following examples, which are set forth merely by way of illustration and not by way of limitation.

*Example 1*

In a vessel equipped with a stirrer, a thermometer and a reflux condenser, and flushed with dry nitrogen while excluding moisture 450 g. of acetone is placed and cooled with ice at 0° C., and 43 g. of ethyleneimine and 72 g. of β-propiolactone are slowly and concurrently added thereto under stirring. The adding velocities are so adjusted that the heat generation due to the reaction is sufficiently controlled. After the addition, the stirring is continued for an additional one hour. The precipitate formed is separated, washed twice with acetone and dried in vacuo. The obtained colorless solid weighs 54 g. with the following analytical values: C, 50.64%; H, 9.87%; and N, 12.77%. The values show that the product is a copolymer composed of approximately equimolar ethyleneimine and β-propiolactone units. The copolymer is readily soluble in water and has a softening point of 70°– 80° C. Upon heating up to 120° C., the copolymer turns to a resinous substance due to the secondary reaction.

The acetone solution left after the separation of the precipitate is evaporated to leave 61 g. of a viscous liquid substance, which is soluble in water but insoluble in chloroform.

*Example 2*

A solution of 7.2 g. of β-propiolactone in 50 ml. of ethyl ether is placed in a fully nitrogen-flushed polymerization flask and cooled to −78° C. Thereto is slowly added a solution of 4.3 g. of ethyleneimine in 50 ml. of ethyl ether, and the temperature of the mixture is allowed to rise gradually up to 0° C., while the mixture is stirred. The reaction is continued at this temperature for 30 hours. During the course of the reaction, white viscous precipitates are formed. The precipitates are separated by decantation, washed thrice with fresh ethyl ether and then dried in vacuo. The resulting colorless, viscous, resinous substance weighs 4.57 g. The infrared absorption spectrum shows the presence of secondary amide-linkage (3360, 3090, 1650 and 1555 cm.$^{-1}$) and ether-linkage (1050 cm.$^{-1}$). Accordingly the product is found to be a copolymer having the unit structure containing both ether- and amide-linkages, i.e.

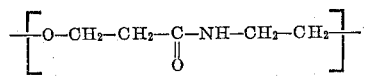

The spectrum also shows a weak absorption at 1730 cm.$^{-1}$, corresponding to that of ester-linkage, probably due to contamination of a small amount of a polyester unit or compound.

*Example 3*

The same procedure as in Example 2 is repeated, excepting that the ethyl ether as solvent is replaced by ethylene dichloride. The colorless powdered copolymer product weighs 3.36 g. The infrared absorption spectrum shows the presence of hydroxy radical (3450 and 1050 cm.$^{-1}$), ester-linkage (1730 and 1190 cm.$^{-1}$), tertiary amide-linkage (1645 cm.$^{-1}$), and carboxyl anion (1590 cm.$^{-1}$). Accordingly, the product is found to be a copolymer having the following unit structures.

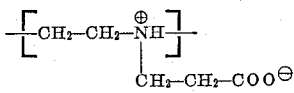

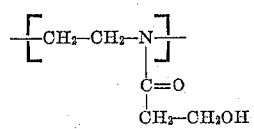

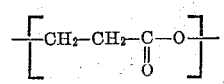

*Example 4*

A solution of 7.2 g. of β-propiolactone in 50 ml. of toluene is placed in a fully nitrogen-flushed polymerization flask and cooled to −78° C. A solution of 4.3 g. of ethylene-imine in 50 ml. of toluene is slowly added thereto. Then, 0.2 g. of triethylamine is added and the temperature is raised up to 0° C. After 10 hours reaction at this temperature, a colorless viscous substance is precipitated. The precipitates are separated by decantation, washed with ethyl ether and dried in vacuo, to yield 4.05 g. of colorless resinous product. The infrared absorption spectrum is similar to that in Example 2.

*Example 5*

The same procedure as in Example 4 is repeated, excepting that the triethylamine is replaced by tin tetrachloride. The colorless solid polymer product weighs 4.80 g. The infrared absorption spectrum is similar to that in Example 2.

Example 6

A solution of 4.3 g. of ethyleneimine in 50 ml. of acetonitrile is mixed with a solution of 7.2 g. of β-propiolactone in 50 ml. at —78° C., and then 0.2 g. of triethylamine is added thereto. The temperature of the mixture is raised up to 0° C., and the reaction is allowed to proceed at this temperature for 10 hours. The colorless powdered product weighs 6.11 g. The infrared absorption spectrum shows that the product is a copolymer containing a major part of the unit structure of

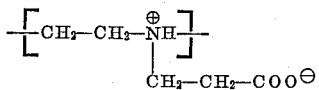

and a minor part of the unit structures of

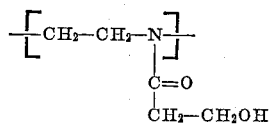

and

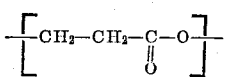

When using dimethylformamide as the solvent instead of the acetonitrile, the same copolymer is obtained in a better yield, 7.42 g.

What we claim is:

1. A copolymer produced by polymerization at a temperature of —20° C. to 200° C. of β-lactone of the formula:

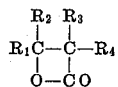

wherein $R_1$ and $R_2$ each represent hydrogen atoms or lower alkyl radicals, and $R_3$ and $R_4$ each represent hydrogen atoms or alkyl, chloromethyl or aryl radicals with an ethyleneimine compound of the formula:

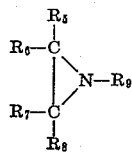

wherein $R_5$, $R_6$, $R_7$ and $R_8$ each represent hydrogen atoms or alkyl radicals, and $R_9$ represents a hydrogen atom, an alkyl or an acyl radical, in a mole ratio ranging from about 1:20 to about 20:1.

2. A copolymer produced by polymerization of β-propiolactone with ethyleneimine in a mole ratio of about 1:1.

3. A method for producing a copolymer which comprises contacting a β-lactone having the formula:

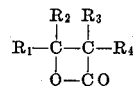

wherein $R_1$ and $R_2$ each represent hydrogen atoms or lower alkyl radicals, and $R_3$ and $R_4$ each represent hydrogen atoms or alkyl, chloromethyl or aryl radicals with an ethyleneimine compound having the formula:

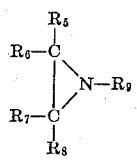

wherein $R_5$, $R_6$, $R_7$ and $R_8$ each represent hydrogen atoms or alkyl radicals, and $R_9$ represents a hydrogen atom, an alkyl or an acyl radical, in a mole ratio ranging from about 1:20 to about 20:1 at a temperature of —20° C. to +200° C.

4. A method according to claim 3, in which the said β-lactone is β-propiolactone and the said ethyleneimine compound is ethyleneimine, and the mol ratio is approximately 1:1.

5. A method according to claim 3, in which the contacting is effected in the presence of a solvent.

6. A method according to claim 3, in which the contacting is effected in the presence of a catalyst selected from the group consisting of triethylamine and tin tetrachloride.

References Cited

UNITED STATES PATENTS 2,587,329   2/1952   Jones _____ 260—561

JAMES A. SEIDLECK, *Primary Examiner.*

J. L. SCHOFER, *Examiner.*

L. WOLF, *Assistant Examiner.*